United States Patent [19]
de Vaan

[11] Patent Number: 5,235,444
[45] Date of Patent: Aug. 10, 1993

[54] IMAGE PROJECTION ARRANGEMENT

[75] Inventor: Adrianus J. S. M. de Vaan, Eindhoven, Netherlands

[73] Assignee: U.S. Philips Corporation, New York, N.Y.

[21] Appl. No.: 879,704

[22] Filed: May 5, 1992

Related U.S. Application Data

[63] Continuation of Ser. No. 669,822, Mar. 15, 1991, abandoned, which is a continuation-in-part of Ser. No. 327,285, Mar. 22, 1989, abandoned.

[30] Foreign Application Priority Data

Aug. 26, 1988 [NL] Netherlands .................. 8802104

[51] Int. Cl.⁵ ............................................. G02F 1/13
[52] U.S. Cl. ......................................... 359/40; 359/41; 359/70; 359/93; 353/31; 353/34
[58] Field of Search .............. 350/331 R, 347 E, 337, 350/389, 401, 402, 172, 173, 174; 353/31, 34, 37; 358/60, 61, 231, 232; 359/40, 41, 70, 93

[56] References Cited

U.S. PATENT DOCUMENTS

| | | |
|---|---|---|
| 4,127,322 | 11/1978 | Jacobson et al. ................. 353/37 |
| 4,239,346 | 12/1980 | Lloyd . |
| 4,500,172 | 2/1985 | Gagnon et al. .................. 350/331 R |
| 4,647,966 | 3/1987 | Phillips et al. .................. 350/331 R |
| 4,786,146 | 11/1988 | Ledebuhr ........................ 350/331 R |
| 4,818,074 | 4/1989 | Yokoi et al. ..................... 350/331 R |
| 4,826,311 | 5/1989 | Ledebuhr ........................ 350/331 R |
| 4,850,685 | 7/1989 | Kamakura et al. ................ 353/31 |

Primary Examiner—Andrew J. James
Assistant Examiner—Courtney A. Bowers
Attorney, Agent, or Firm—John C. Fox

[57] ABSTRACT

An image projection arrangement is disclosed, comprising a radiation source (1), an image display system having at least one image display panel (10) in which the polarisation direction of an incident beam is modulated with the image information, and a polarisation-sensitive beam splitter (2), arranged between the source and the image display system, for forming two mutually perpendicularly polarised sub-beams ($b_1$, $b_2$). By having the two sub-beams be modulated by the same image display system (10) and by thereafter combining these sub-beams again a very efficient use can be made of the available light without the necessity of a significant more complex design of the arrangement.

19 Claims, 12 Drawing Sheets

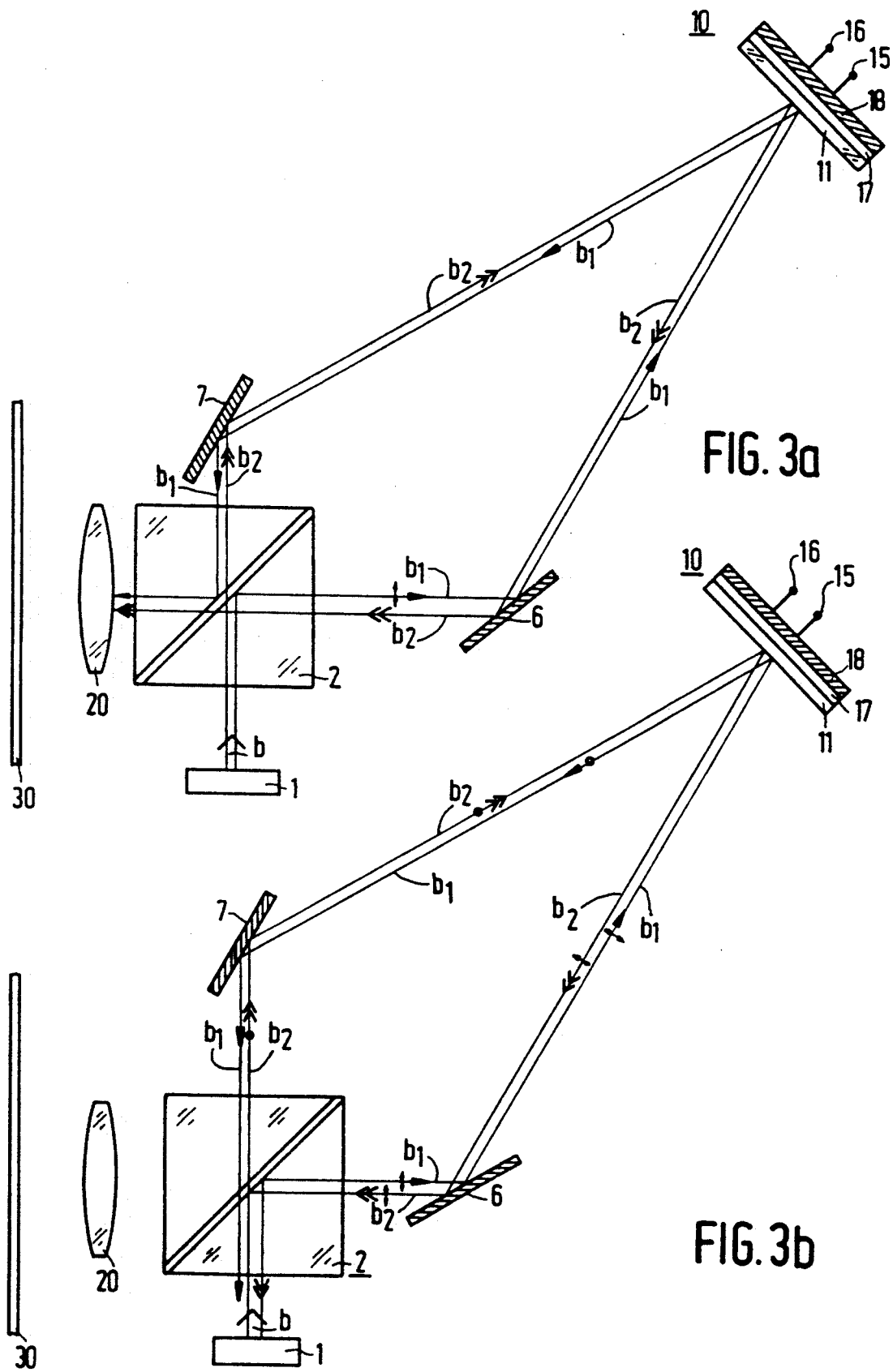

IMAGE PROJECTION ARRANGEMENT

This is a continuation of application Ser. No. 07/669,822, filed on Mar. 15, 1991, abandoned which is a continuation-in-part of application Ser. No. 07/327,285, filed on Mar. 22, 1989, abandoned.

BACKGROUND OF THE INVENTION

The invention relates to an image projection arrangement, comprising a radiation source, an image display system having at least one image display panel for generating an image to be displayed and wherein the direction of polarisation of the beam originating from the source is modulated in accordance with the image information, a projection lens system for projecting the image produced by the image display system onto a projection panel, a polarisation-sensitive beam splitter being arranged in the path of the beam coming from the source for producing two mutually perpendicular-polarised sub-beams which are each intended to be modulated with image information.

The concept of image projection arrangement must be understood in a very general sense and comprises an arrangement for displaying, for example, a video image, a graphic image, numerical information or a combination thereof. The images may be both monochrome and colour images. In the latter case, the display system may have three colour channels for, for example, the primary colours red, green and blue, each channel including a display panel.

Such an image projection arrangement for a colour image is disclosed in the U.S. Pat. No. 4,127,322. The display panels of the prior art arrangement are reflective light valves having as the active, or image producing, element a layer of liquid crystalline material of the so-called nematic type. This layer locally changes the polarisation direction of an incident light beam, in dependence on the image information. For that purpose the light beam must be linearly polarised, for which a polarisation-sensitive beam splitter is arranged in the path of the beam originating from the light source. This beam splitter splits the light beam into two, mutually perpendicular-polarised sub-beams. Only one of these beams is transmitted to a display system, so that approximately half of the light of the radiation source reaches this display system.

So as to make a more efficient use of the light from the source, the U.S. Pat. No. 4,127,322 proposes the use of a second display system. Therein the first display system is exposed to the sub-beam polarised in a first direction and the second display system to the sub-beam polarised in the second direction. After modulation by the display systems the beams are combined by the same polarisation-sensitive beam splitter which also effected splitting according to polarisation direction. Thus, in principle, 100% of the light from the radiation source is used for the image projection.

In the arrangement disclosed in the U.S. Pat. No. 4,127,322, the number of display valves is twice the number in more conventional arrangements. In addition, each display valve forms part of a complex, relatively large and expensive system. In this system an image is generated by means of a cathode-ray tube. The light beam emanating from this tube is incident onto a photo-conducting layer in which a charge pattern is produced in accordance with the image on the cathode-ray tube. As a result thereof, an electric field is formed, also in accordance with the image on the cathode-ray tube, across a layer of liquid crystalline material disposed between the photo-conductive layer and a second, counter, electrode. The varying electric field produces a variation of the birefringence within the liquid crystalline layer and consequently local differences in the shift of the polarisation direction of a projection beam incident on this layer. To enable proper operation this system must be provided with yet a number of additional layers. The arrangement disclosed in the U.S. Pat. No. 4,127,322 is intended for professional applications, and, because of its complex structure, size and cost price is not so suitable for consumer purposes.

More suitable for consumer, and other, applications are the so-called matrix controlled display panels having a layer of liquid crystalline material between two electrodes. In the case of a passively controlled display panel, both electrodes are distributed into rows and columns, and in the case of an actively controlled display panel a matrix of electronic drive circuits are provided on one of the electrodes. In both cases the panel is divided by the electrode matrix into a large number of image elements. The electrode matrix is controlled by an electronic signal, for example a video signal. An image projection arrangement comprising display panels of this type is less complicated, cheaper and of smaller bulk than the arrangement disclosed in the U.S. Pat. No. 4,127,322. However, due to the construction of the display panels, the useful luminous flux is small. In, for example, the case of an actively controlled display panel, only approximately 10% of the light from the source is transmitted to the projection lens system via the display panel.

OBJECTS AND SUMMARY OF THE INVENTION

The present invention has for its object to provide a significantly more efficient use of the available light in an image projection arrangement having matrix-controlled display panels without the necessity of a significantly more complex structure of the arrangement. To that end the arrangement according to the invention, is characterized in that the two sub-beams are incident on a common system.

The image display system may be a monochromatic system and be comprised of only one image display panel, but it may alternatively be a colour display system of variable design.

In the image projection arrangement according to the invention the common display panel modulates both polarisation directions of the projection light, so in principle all the available light, so that an optimum use is made of this light without the need for additional image display panels.

The most simple embodiment of the arrangement according to the invention, is characterized in that it comprises only one polarisation-sensitive beam splitter for both producing the two sub-beams and combining the sub-beams after they have been modulated by the image display system, and at least two reflectors which are both included in the radiation paths of the two sub-beams for re-directing the sub-beams emanating from the beam splitter to the beam splitter, via the image display system.

In this arrangement the number of optical elements is minimal.

This simple embodiment may be further characterized in that the image display panels are radiation-transmissive and that the sub-beams are incident on these panels substantially perpendicularly.

This perpendicular angle of incidence contributes to satisfying the requirement for the path length for the differently coloured partial sub-beams in a colour image projection device to be as equal as possible, and prevents any angle-dependency of a liquid crystal display panel from affecting the quality of the projected image.

Alternatively, this simple embodiment may be characterized, in that the display panels are reflective. The sub-beams can then, for example, be incident on these panels at an acute angle.

A further embodiment of the image projection device according to the invention having a radiation-transmissive image display system and wherein a first polarisation-sensitive beam splitter is provided for splitting the beam coming from the radiation source into two mutually perpendicularly polarised sub-beams, is characterized by a second polarisation-sensitive beam splitter for combining the modulated sub-beams, a third polarisation-sensitive beam splitter and a plurality of reflectors, the radiation path between the first and second beam splitter for the first sub-beam comprises reflection from a first and a second reflector, and from the third beam splitter passage through the display system and reflection from a third reflector, whilst the said radiation path for the second sub-beam comprises passage through the image display system and through the third beam splitter and reflection from a fourth and fifth reflector.

This embodiment has the advantage that the different reflectors need only to reflect beams having one polarisation direction and consequently these reflectors can be optimised for the relevant polarisation direction as regards their reflection power.

In accordance with a further characteristic feature of this embodiment in the path portions of the first sub-beam which do not coincide with the path portions of the second sub-beam, polarisation-sensitive absorption filters are arranged which block light having a polarisation direction different from that of the first sub-beam.

This enables an increase in the degree of polarisation of the sub-beams. The degree of polarisation is the quotient of the light having the desired polarisation direction and the total quantity of light in the beam.

An embodiment of the image projection device according to the invention, which is important for practical use, is characterized in that the image display system is a colour image display system comprising colour-selective elements and a composite liquid crystal display panel whose image elements are divided into groups, each group generating a sub-image of a given colour corresponding to the colour of the colour-selective elements added to the relevant group of image elements.

This colour image image system may have the further characteristic feature that the colour-selective elements are constituted by a plurality of colour-selective beam splitters, for splitting the sub-beams into three monochrome partial sub-beams of different colours and for combining the partial sub-beams modulated with monochrome image information to form a colour image information-modulated sub-beam, and that in the path of each of the partial sub-beams a separate image display panel is arranged whose collective image elements constitute one of said groups of image elements.

Alternatively, this embodiment may have the further characteristic feature that the colour image display system has one image display panel whose image elements are divided into groups, each group generating a sub-image of a predetermined colour and that for each of the image elements a colour filter is provided which only transmits light having the colour corresponding to the colour of the sub-image to be generated by the group to which the relevant image element belongs.

The embodiment of the alternative characteristic has the advantage that the colour image projection device comprises a minimum number of optical components and is very compact.

The above-formulated invention achieves the following objectives: to provide an image projection device in which the available light is used as efficiently as possible and which it is as simple and cheap as possible can be satisfied to a still greater extent if this device has the further characteristic feature that the polarisation-sensitive beam splitter is formed by a set of two transparent elements having the same single index of refraction, two surfaces of which face each other, between which surfaces a layer of oriented liquid crystalline material is provided of which one refractive index is equal to that of the said elements while the other refractive index is less than that of the said elements.

This beam splitter is cheaper than other polarisation-sensitive beam splitters and furnishes an appropriate polarisation separation over a relatively large range of wavelengths and for a large range of angles of incidence.

BRIEF DESCRIPTION OF THE DRAWING

The invention will now be described in greater detail by way of example with reference to the accompanying drawings. Therein the FIGS. 1a and 1b illustrate an embodiment of the arrangement having one image display panel with the radiation paths for an optically non-active and an optically active panel, respectively, FIGS. 3a and 3b illustrates a first embodiment of the arrangement having a reflective image display panel.

In these Figures corresponding elements are given the same reference numerals.

DESCRIPTION OF THE PREFERRED EMBODIMENT

Figure 1A:
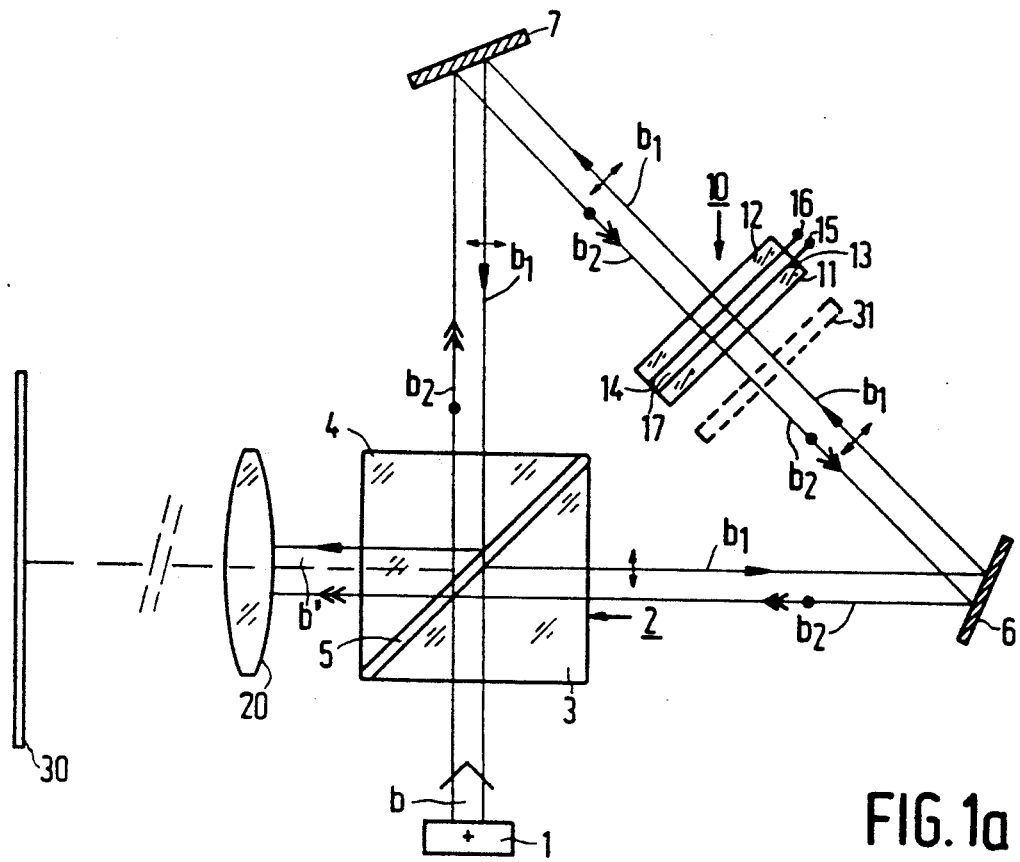

In FIG. 1a, reference numeral 1 denotes a radiation source emitting a beam b. The beam comprises two beam components with mutually perpendicular polarisation directions. Of this beam only the chief ray is shown which, with the object of indicating the two differently polarised components, is split into two rays. In actual practice these rays coincide. The beam b is incident onto polarisation-sensitive beam splitter 2, for example constituted by two transparent prism portions 3 and 4 between which a polarisation-separating layer 5 is provided. The layer 5 reflects the beam component whose polarisation direction is parallel to the plane of incidence, the so-called p-component and transmits the component whose polarisation direction extends transversely of the plane of incidence, the so-called s-component. The plane of incidence is the plane formed by the incident ray and the normal on the layer 5. The reflected component, denoted by the sub-beam $b_1$, is directed to the display panel 10 by a reflector 6.

This panel has a layer of liquid crystalline material 17, for example of the nematic type, enclosed between two transparent, for example glass, plates 11 and 12. Each of these plates may comprise a transparent control electrode 13 and 14, which electrodes can be divided into a large number of rows and columns, thus defining a large number of image elements in the display panel. The different image elements can then be controlled by driving the matrix electrodes, as is shown schematically by means of the drive terminals 15 and 16. Thus, an electric field can be applied at the desired position across the liquid crystalline material 17. Such an electric field causes a change of the effective refractive index of the material 17, so that the light passing through a given image element is submitted or not submitted to a rotation of the polarisation direction, depending on whether a local electric field is present or not present in the region of the relevant image element.

Instead of this what is commonly referred to as passively controlled image display panel an actively controlled panel may alternatively be used. In this latter type of image display panel one of the substrate plates is provided with an electrode whilst the other plate is provided with the semi-conductor drive electronics. Each of the image elements is now driven by its own active control element, such as, for example, a thin film transistor.

Both types of directly driven image display panels are described in, for example, the European patent application no. 0,266,184.

The sub-beam $b_1$ passing through the image display panel 10 is directed to the polarisation-sensitive beam splitter 2 by a second reflector 7. FIG. 1a shows the situation in which the display panel is energised, that is to say the polarisation direction of the sub-beam $b_1$ is not changed. The sub-beam $b_1$ incident on the polarisation-sensitive beam splitter 2, having the p-polarisation direction is then reflected towards a projection lens system 20, which is denoted schematically by means of a single lens element. This lens system forms an enlarged image of the display panel enlarged on a projection panel 30, the optical path length between this panel and the lens system 20 being relatively long. So as to limit the dimensions of the arrangement the path between the lens 20 and the panel 30 can be folded with the aid of additional reflectors.

Figure 1B:
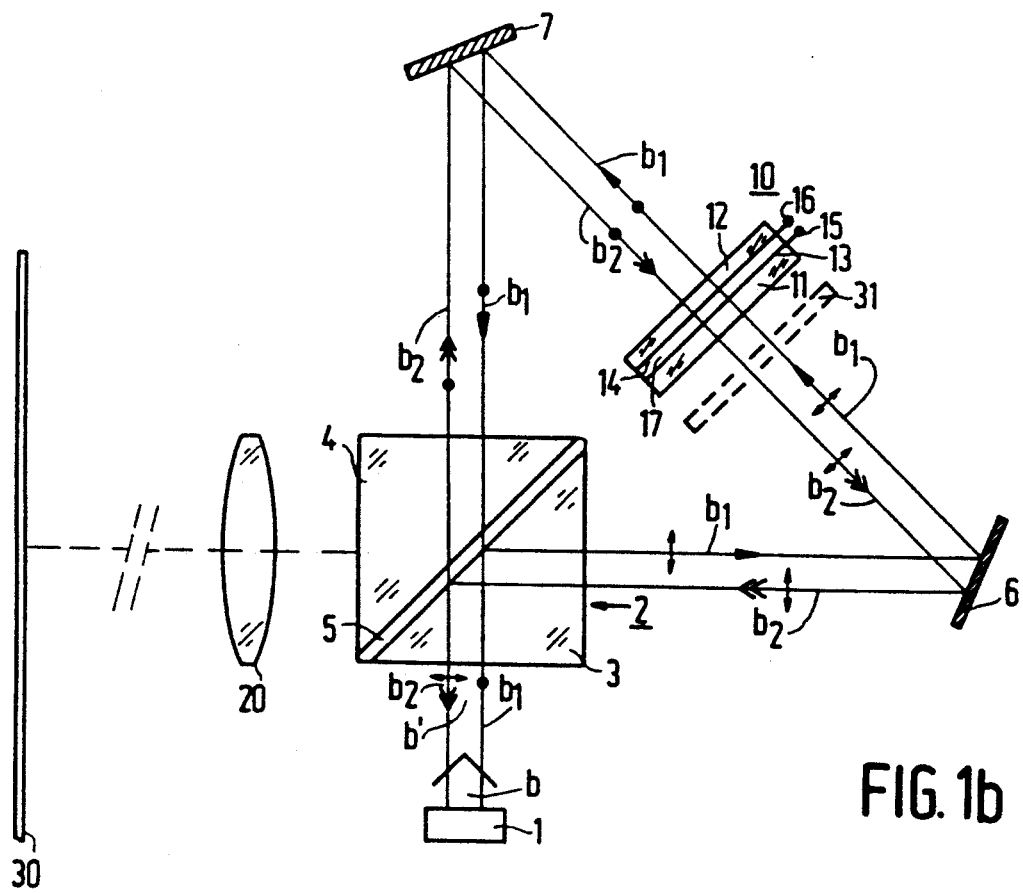

FIG. 1b illustrates the situation in which the panel 10 is not energised so that the polarisation direction of the incident sub-beam $b_1$ is shifted through 90° and this beam leaves the panel as an s-polarised beam. This beam is then transmitted by the beam splitter towards the radiation source 1 and does not reach the projection panel 30.

According to the invention, the sub-beam $b_2$ denoted by double arrows, this sub-beam having the s-polarisation, denoted by means of the small circles in the beam, is directed to the image display panel via the reflector 7. After having passed through the panel 10 the polarisation direction of the sub-beam $b_2$ has either remained constant or has been rotated through 90°, depending on whether the panel 10 was energised or not. After the sub-beam $b_2$ has been reflected by the reflector 6 it is reflected by the beam splitter 2 towards the radiation source 1, or transmitted to the projection lens system 20.

The beam splitter 2 does not only provide the formation of the two sub-beams, but also ensure that, after having been modulated by the image display panel, these sub-beams are again combined to one beam b'. In addition, the polarisation-sensitive beam splitter 2 ensures that the polarisation modulation of the sub-beams is converted into an intensity variation of these sub-beams. This beam splitter replaces, in this embodiment and further embodiments still to be described, a polariser and an analyser which in more conventional arrangements are disposed before and behind, respectively, the image display panel. Because of the many and various functions of the beam splitter 2 the number of elements can be limited to a minimum in the embodiment shown in the FIGS. 1a and 1b.

It will be obvious that on projecting an image by means of an arrangement as illustrated in the FIGS. 1a and 1b, the two sub-beams will not be rotated in their totality as regards their direction of polarisation. Only those portions of the sub-beams originating from the non-energised image elements will be submitted to this polarisation rotation.

In the embodiment described, the image elements across which no electric field is applied are shown as black elements on the projection panel 30. It is alternatively possible to energise an image element in such a manner, that is to apply such a field strength across it, that the polarisation direction of the incident linearly polarised light is not rotated through 90° but that this linearly polarised light is converted into an elliptically polarised light. This light is split by the polarisation-sensitive beam splitter 2 into the p-and s-components, the p-component being reflected to the projection panel and the s-component being transmitted to the light source. The relevant beam element is then not shown as a black or a white element on the projection panel but as a grey element, the grey shade being adjustable.

If use is made of an image display panel whose image elements rotate in the energised state the polarisation direction and do not rotate it in the non-energised state, an additional layer of liquid crystalline material which rotates the polarisation direction of the entire sub-beams through 90° can be arranged in series with the image display panel 10, so that the image on the projection panel has the same polarity as the image formed in an arrangement having an image display panel whose image elements do not rotate the polarisation direction in the energised state.

An additional polarisation shifter, shown in FIGS. 1a and 1b by reference numeral 31, can alternatively be used if in an arrangement in which the image elements in the energised state do not rotate the polarisation direction one wants to have these image elements still appear as black elements on the projection panel, for example to obtain an increased contrast or to effect a decrease in the colour dependency of the arrangement, or in order to increase the switching rate of the display panel.

Instead of a layer of liquid crystalline material it is alternatively possible to use a $\lambda/2$-plate, or for a reflective display panel a $\lambda/4$-plate, wherein $\lambda$ is the wavelength of the projection light, as an additional polarisation rotator 31. This polarisation rotator is also suitable for use in embodiments still further to be described hereinafter.

In principle, the image display panel 10 can be provided in any arbitrary position between the reflectors 6 and 7 but alternatively also between the beam splitter 2 and the reflector 7 or between the reflector 6 and the beam splitter 2. Preferably however, the panel 10 is positioned such that the optical path length from the beam-splitting plane 5 to the panel 10 is the same for both sub-beams, so that for diverging sub-beams the cross-sections of these beams are identical in the region of the panel, and furthermore for both sub-beams the optical path length between the panel 10 and the projection lens is identical.

Figure 2A:
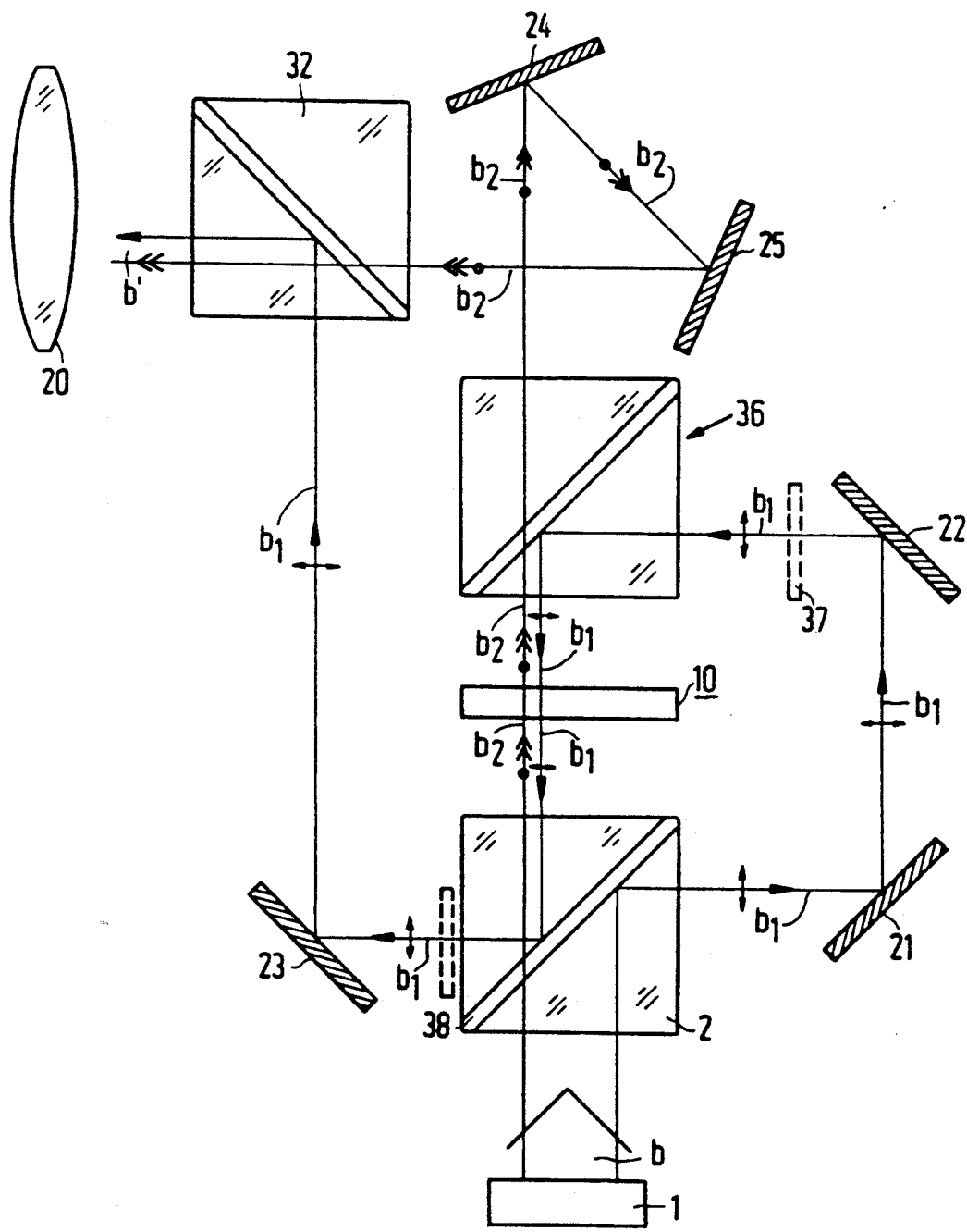
FIGS. 2a and 2b illustrate an embodiment of the arrangement having three polarisation-sensitive beam splitters with again the radiation paths for an optically non-active and an optically active image display panel, respectively.
Figure 2B:
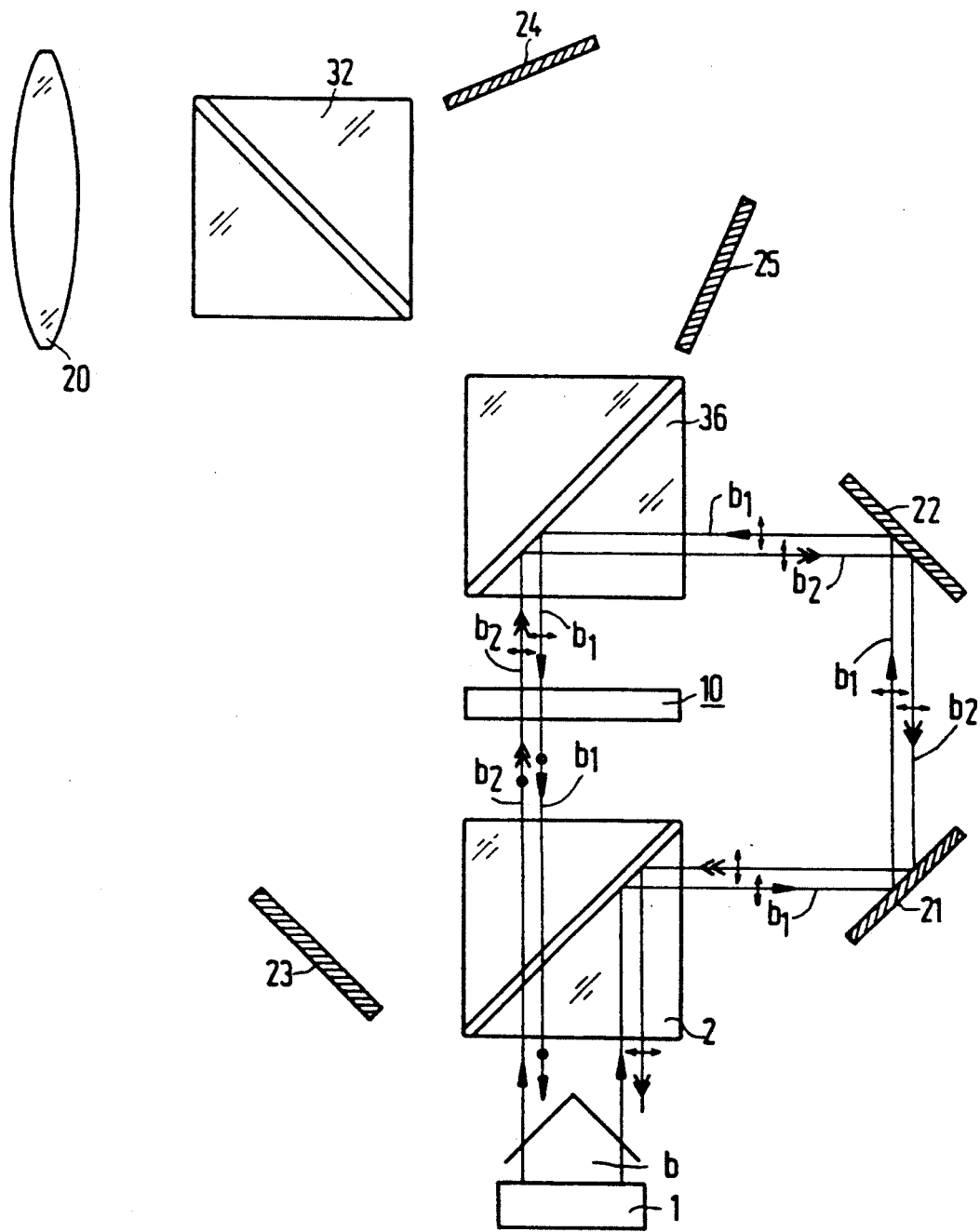

The FIGS. 2a and 2b illustrate a second embodiment of the image projection arrangement, FIGS. 2a and 2b respectively, showing the radiation paths for the sub-beams $b_1$ and $b_2$ for an energised and nonenergised image display panel 10. In addition to the first polarisation-sensitive beam splitter 2, this arrangement includes a second polarisation-sensitive beam splitter 32 for combining the sub-beams after they have been modulated by the panel. Furthermore, a third polarisation-sensitive beam splitter 36 is provided, which is used as a polarisation-selective reflector, which, for example, reflects p-polarised light and transmits s-polarised light. The arrangement further comprises five reflectors 21, 22, 23, 24 and 25.

The p-polarised sub-beam $b_1$ originating from the beam splitter 2 is reflected by the reflectors 21 and 22 towards the polarisation-sensitive beam splitter 36 which in its turn reflects the sub-beam towards the display panel 10. The beam portions whose polarisation direction is not rotated (FIG. 2a) are reflected by the beam splitter 2 towards a reflector 23 which reflects the beam portions to the beam splitter 32. The last beam splitter reflects the p-polarised beam portions towards the projection lens system 20. The portions of the sub-beam $b_1$ whose polarisation direction is rotated, and which leave the panel 10 as s-polarised components (FIG. 2b) are transmitted by the beam splitter 2 towards the radiation source 1.

The s-polarised sub-beam $b_2$ originating from the beam splitter 2 first passes through the display panel 10. The portions of this sub-beam, whose polarisation direction is not rotated (FIG. 2a) pass through the third beam splitter 36 and are thereafter reflected towards the polarisation-sensitive beam splitter 32 by the reflectors 24 and 25. This last beam splitter transmits said portions of the sub-beam $b_2$ to the projection lens system 20. The portions of the sub-beam $b_2$ whose polarisation direction is indeed rotated, and which consequently leave the panel 10 as p-polarised components (FIG. 2b) are reflected, in this sequence, by the reflectors 22 and 21 and the beam splitter 2 to the radiation source 1.

Since the light paths for the s- and p-polarisation components are spatially separated, the degree of polarisation of the sub-beams can be increased by incorporating in the separate path portions of these sub-beams additional elements which block light having an unwanted polarisation direction. As in practice the p-polarised light reflected by the beam splitter 2 will more easily be contaminated by s-polarised light than the s-polarised light passed by the beam splitter 2 is contaminated with p-polarised light, absorbing elements 37 and 38 which only absorb radiation of the s-polarisation are preferably, as is shown in FIG. 2a, arranged between the beam splitter 36 and the reflector 22 and between the beam splitter 2 and the reflector 23.

In addition, in contrast to the reflectors in the embodiment of the FIGS. 1a and 1b, the reflectors in the embodiment shown in the FIGS. 2a and 2b need only to reflect one polarisation direction. Only p-polarised light is incident on the reflectors 21, 22 and 23 and only s-polarised light on the reflectors 24 and 25. Consequently, the reflection power of these reflectors can be optimised, that is to say it can be at a maximum for the desired polarisation direction, which increases the light output of the arrangement.

The invention is not only suitable for use in an image projection arrangement having a radiation-transmissive image display panel but also in an arrangement of that type having a reflecting image display panel. Such a panel, driven from a cathode-ray tube, is disclosed in said U.S. Pat. No. 4,127,322, whilst a directly driven reflective image display panel is disclosed in the U.S. Pat. No. 4,239,346.

The FIGS. 3a and 3b illustrate an embodiment of an image projection arrangement according to the invention having a reflective image display panel. This panel 10 again has a layer of liquid crystalline material 17 embedded between two substrate plates 11 and 18. The plate 11 is transparent whilst plate 18 is reflective. Control electronics is integerated in the plate 18. The control signal, for example a video signal, is applied to the driver electrodes 15 and 16 provided at the rear face of the plate 18.

Apart from the fact that the image display panel 10 is reflective instead of transparent, the structure and mode of operation of the arrangement of FIGS. 3a and 3b correspond for a large part to that of the FIGS. 1a and 1b. FIG. 3a again shows the situation in which the image display panel does not effect polarisation rotation and the sub-beams $b_1$ and $b_2$ after having passed through the path to and from the panel, reach the projection panel 30 via the beam splitter 2 and the projection lens system 20. In FIG. 3b the image display panel does rotate the polarisation direction of the sub-beams $b_1$ and $b_2$ and these sub-beams ultimately return to the radiation source 1 via the beam splitter 2.

For a proper operation of the image display panel the sub-beams $b_1$ and $b_2$ must not be incident on this panel at excessive angles to the normal. So as to limit the angles of incidence, the image display panel can be positioned at a relatively large distance from the beam splitter. It is possible to "fold" the radiation path with the aid of additional reflectors between the reflector 6 and the panel 10 on the one hand and between this panel and the reflector 7 on the other hand, so that the dimensions of the projection arrangement can be of limited size.

It should be noted that only those elements which are necessary to understand the invention are included in FIGS. 3a and 3b. In the practical embodiment of the arrangement shown in FIGS. 3a and 3b at least one additional reflector will be provided to achieve that the two sub-images are superimposed on each other with the same orientation, i.e. not mirror-inverted with respect to each other.

Figure 4:
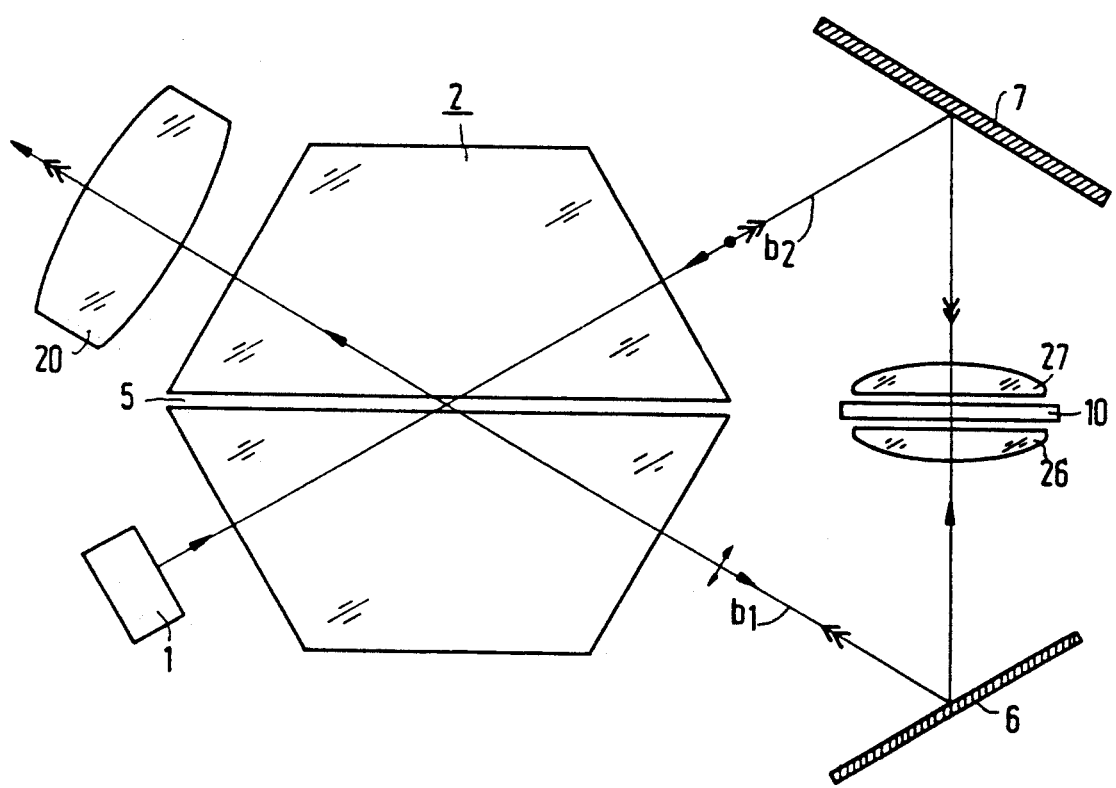
FIG. 4 illustrates an embodiment of the projection device having two field lenses.

FIG. 4 illustrates a further embodiment of an image projection arrangement having a radiation-transmissive display panel. This embodiment differs from the embodiment shown in the FIGS. 1a and 1b in that the polarisation-sensitive beam splitter 2 has a different construction, as a result of which the radiation source 1 and the projection lens system 20 are arranged differently relative to each other. Two additional lenses 26 and 27 are provided as extra elements in the embodiment of FIG. 4, on both sides of the display panel 10, which act as field lenses. These lenses reduce the divergence of the sub-beams $b_1$ and $b_2$ and provide that, at limited dimensions of the image projection arrangement, the highest possible amount of light from the source 1 is coupled into the pupil of the projection lens system 20.

Figure 5A:
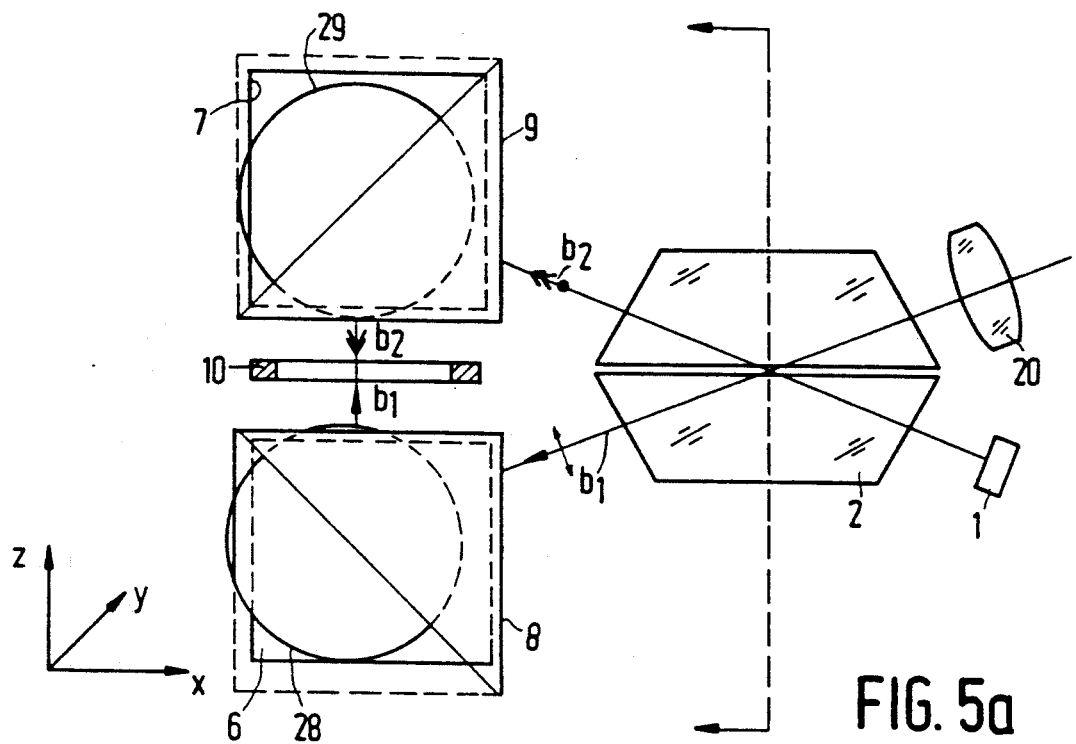
FIGS. 5a and 5b illustrate an embodiment of the projection device with reduced dimension in one direction.
Figure 5B:
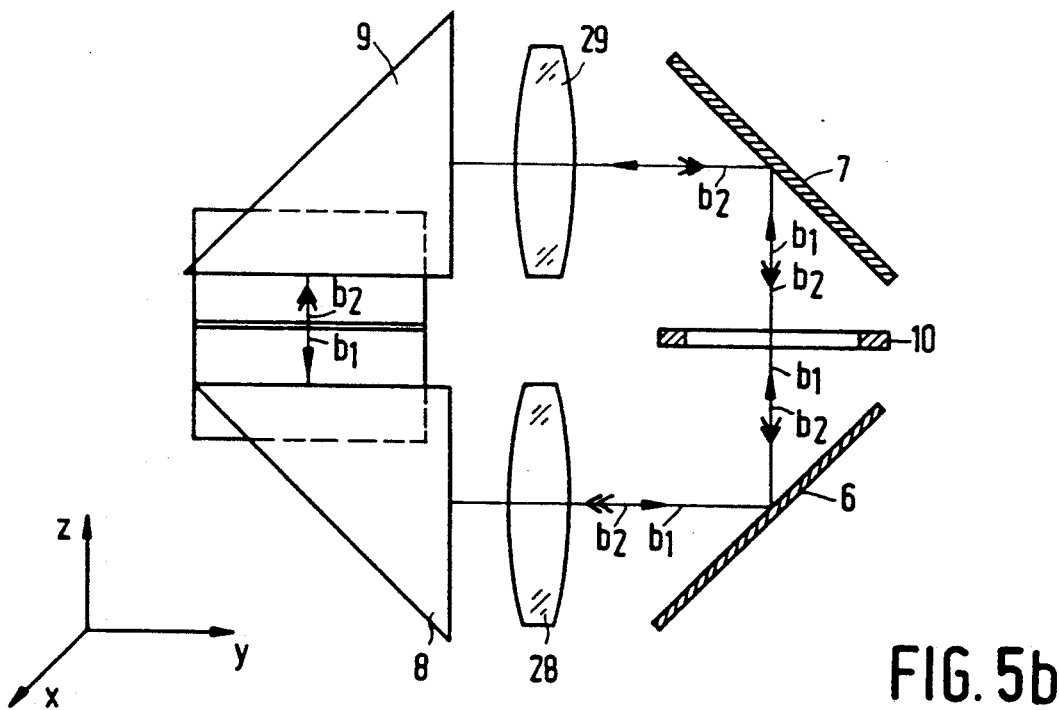

FIGS. 5a and 5b illustrate an embodiment of the image projection arrangement whose length in one direction is of a reduced size as a portion of the light path extends in a different direction. FIG. 5a is a side elevational view of the arrangement, or a cross-sectional view in the XZ plane, while FIG. 5b is a cross-sectional view in the YZ plane of the arrangement. Compared with the arrangement shown in the FIGS. 1a and 1b, the arrangement shown in the FIGS. 5a and 5b has two reflectors 8 and 9 and two lenses 28 and 29 by way of additional elements.

The projection beam b originating from the light source 1 is split by the polarisation-sensitive beam splitter 2 into a p-polarised sub-beam $b_1$ and into an s-polarised sub-beam $b_2$. These sub-beams are incident on the reflectors 8 and 9, respectively. These reflectors are at such an angle with the YZ plane on the one hand and the XZ plane on the other hand that in principle they reflect the sub-beams $b_1$ and $b_2$ into the Y direction. The sub-beam $b_1$ and $b_2$, respectively, is thereafter directed to the radiation-transmissive display panel 10 by the respective reflectors 6 and 7. After having passed this panel, the sub-beam $b_1$ and the sub-beam $b_2$, respectively, pass in the opposite direction through the same path the sub-beam $b_2$ and the sub-beam $b_1$, respectively, have passed through. The sub-beams $b_1$ and $b_2$ finally reach the projection lens system 20 or the light source 1, depending on whether the polarisation direction of these beams has been shifted or not.

The lenses 28 and 29 provide that the diverging sub-beams, going to the image display panel, are converted into less diverging or converging beams so that the dimensions of the optical elements in the arrangement may be of a limited size. These lenses are denoted as "relay" lenses or intermediate lenses.

Figure 6:
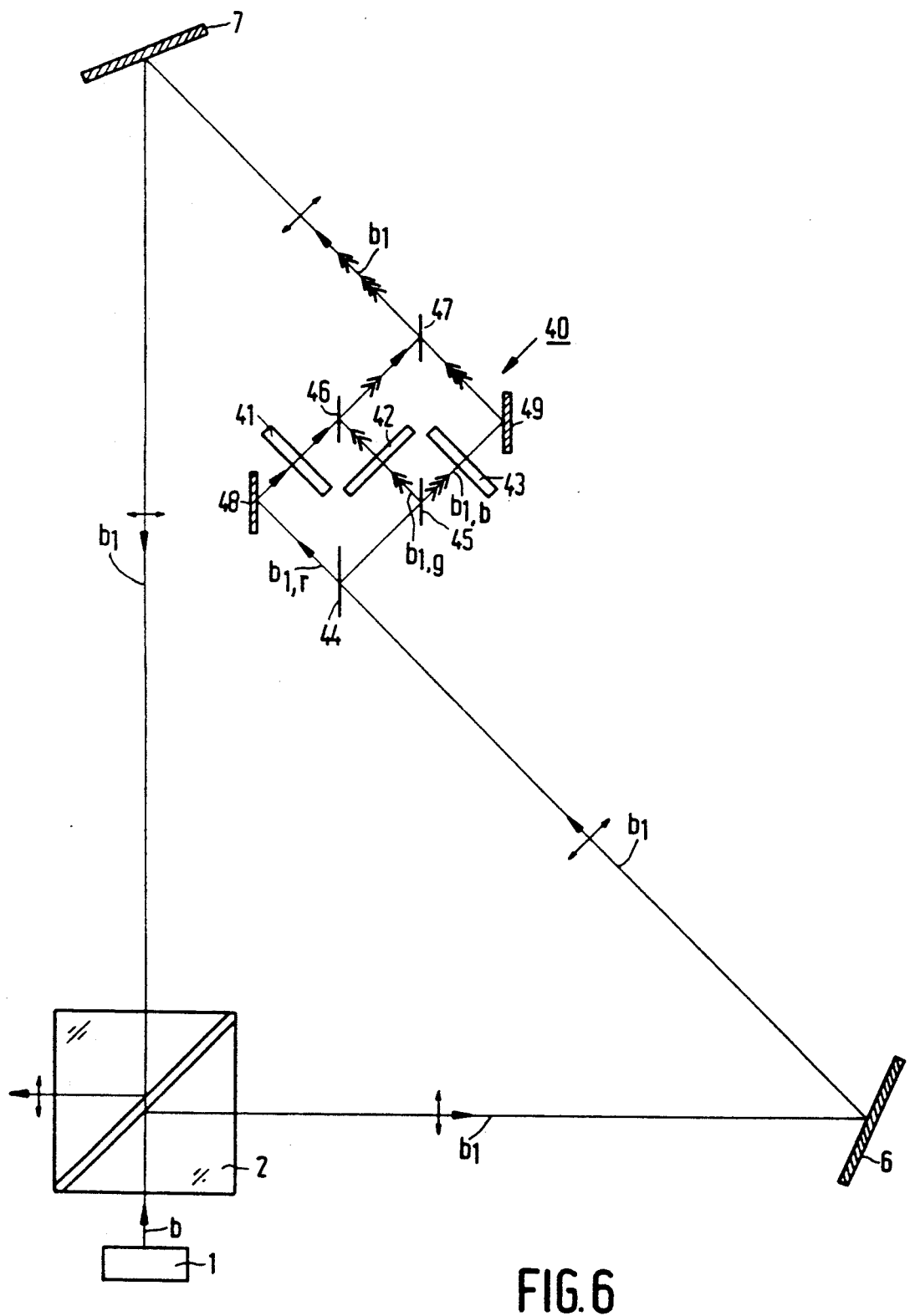
FIG. 6 illustrates a first embodiment of a colour image projection device with transmissive image display panels.

If a colour image is to be projected, it is possible to use instead of an image display system having one display panel a composite image display system having, for example, three display panels and a plurality of colour-selective beam splitters. FIG. 6 shows an embodiment of such a composite image display system, provided in an embodiment of an image projection arrangement similar to that shown in the FIGS. 1a and 1b.

For the sake of clarity, only the radiation path of the sub-beam $b_1$ is shown in this Figure. In a similar manner as shown in the FIGS. 1a and 1b, the sub-beam $b_2$ passes through the same radiation path in the opposite direction.

After having been reflected from the reflector 6, the sub-beam $b_1$ is incident on a first colour-selective beam splitter 44, for example a dichroic mirror, which transmits, for example, red light and reflects blue and green light. The red beam $b_{1,r}$ is reflected to a first display panel 41 by a reflector 48 which may be a neutral reflector or a red reflector. In this panel the red sub-image is generated so that the beam $b_{1,r}$ is modulated with the red colour information. The light reflected by the beam splitter 44 is split by a second colour-selective beam splitter 45, which, for example reflects green light and transmits blue light, into a green beam $b_{1,g}$ and a blue beam $b_{1,b}$. These beams are incident on the respective display panels 42 and 43 in which the green and the blue sub-image respectively, is generated. After having been passed through their image display panels, the sub-beams $b_{1,r}$ and $b_{1,g}$ are combined again with the aid of a third colour-selective beam splitter 46 which transmits the red beam and reflects the green beam. The blue beam emitted from the panel 43 is reflected to a fourth colour selective beam splitter 47 by a reflector 49, which may or may not be of a blue reflector. Said last beam splitter transmits the blue beam and reflects the combined red-green beam, so that all the light is combined again into one beam. This beam is conveyed by the reflector 7 to the polarisation-sensitive beam splitter 2 which reflects the light originating from driven image elements in the panel to the projection lens system, not shown, and allows the remaining light to pass to the source 1.

The sequence of the colour-selective elements and the image display panels may of course also be chosen differently from the sequence shown in FIG. 6.

Figure 7A:
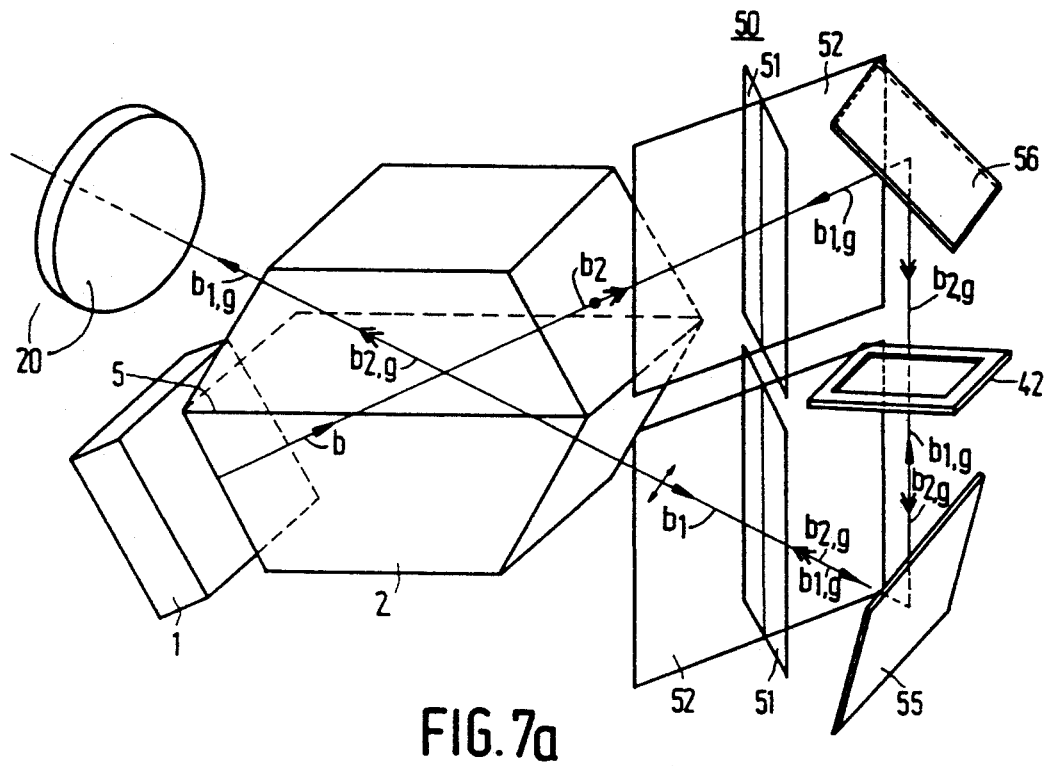
FIGS. 7a and 7b illustrate a second embodiment of a colour image projection device with transmissive image display panels.
Figure 7B:
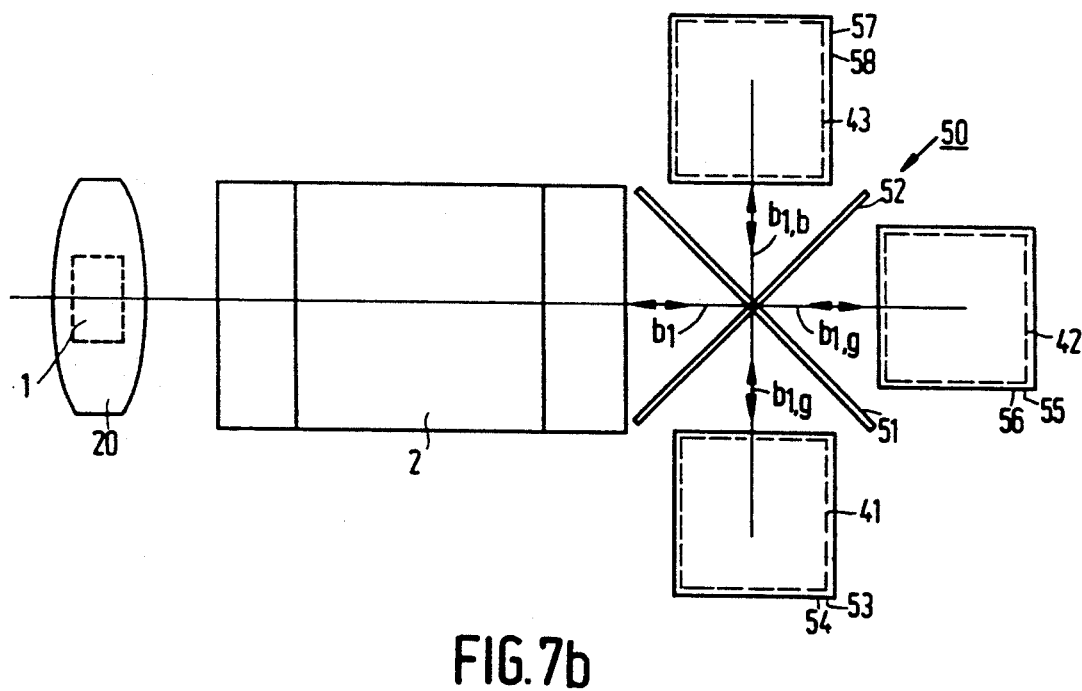

The FIGS. 7a and 7b show a compact embodiment of a colour image projection arrangement according to the invention, in which the colour separation of the sub-beams is effected with the aid of two intersecting dichroic mirrors, alternatively denoted dichroic cross. FIG. 7a is a perspective view of the arrangement, whereas FIG. 7b is a schematic plan view of the arrangement. For the sake of clarity only the radiation path for the green partial sub-beams $b_{1,g}$ and $b_{2,g}$ are shown in FIG. 7a.

Of the projection beam b originating from the light source 1 the p-polarised sub-beam $b_1$ is reflected by the beam separating plane 5 of the polarisation-sensitive beam splitter 2 to the lower portion of the dichroic cross 50. This cross is formed by two dichroic mirrors 51 and 52 of which the mirror 50 reflects red light and transmits blue and green light, whereas the mirror 51 reflects blue light and transmits red and green light. Consequently, of the sub-beam $b_1$ only the green component $b_{1,g}$ is transmitted to a reflector 55. This reflector directs the component $b_{1,g}$ to the display panel 42 in which the green sub-image is generated. The sub-beam component $b_{1,g}$ modulated with the information of this sub-image is reflected by a reflector 56 and transmitted through the upper portion of the dichroic cross 50 to the polarisation-sensitive beam splitter 2. At the separating plane 5 the sub-beam component $b_{1,g}$ is reflected to the projection lens system 20 or transmitted to the radiation source 1, depending on the fact whether the polarisation direction of the sub-beam component is rotated or not rotated by the display panel 42.

The red beam component $b_{1,r}$ reflected by the dichroic mirror 51 and the blue beam component $b_{1,b}$ reflected by the dichroic mirror 52 pass through sub-systems which are similar to the sub-system for the green beam component. These sub-systems comprise reflectors 53 and 54 and a display panel 41, and reflectors 57 and 58 and a display panel 43, respectively, as is shown in the plan view in FIG. 7b. After having been modulated by the associated image display panels, the sub-beam components $b_{1,r}$ and $b_{1,b}$ are combined with the component $b_{1,g}$ by the dichroic cross 50. Of the total colour image information-modulated sub-beam $b_1$ the polarisation modulation is converted into an intensity modulation, by the polarisation-sensitive beam splitter 2 whereafter the sub-beam $b_1$ is projected via the lens system 20 to the projection panel, not shown.

Since the colour-separating properties of the dichroic mirrors 51 and 52 depend on the direction of polarisation of the incident light, one of the reflectors 53 and 54 in the red channel is preferably a red reflector, whereas one of the reflectors 57 and 58 in the blue channel reflects only blue light. Also in this case said red and blue reflectors may be dichroic mirrors.

To allow a compact design of the arrangement shown in FIGS. 7a and 7b, two field lenses which are similar to the field lenses 26 and 27 in the arrangement of FIG. 4 can be provided before and behind each image display panel 41, 42 and 43.

Instead of providing two lenses in each colour channel the same object can also be achieved by using a total of only two lenses positioned in a similar manner in the arrangement as the intermediate lenses 28 and 29 in FIG. 5b, the dichroic cross together with the elements 41–43 and 53–58 being provided at the position of the display panel 10 of FIG. 5b. Instead of only field lenses or intermediate lenses only combinations of such lenses can alternatively be used in the different embodiments.

It will be obvious that the s-polarised sub-beam $b_2$, which is not shown in the FIGS. 7a and 7b, can pass through the same path as the sub-beam $b_1$ but then in the opposite direction.

Figure 8A:
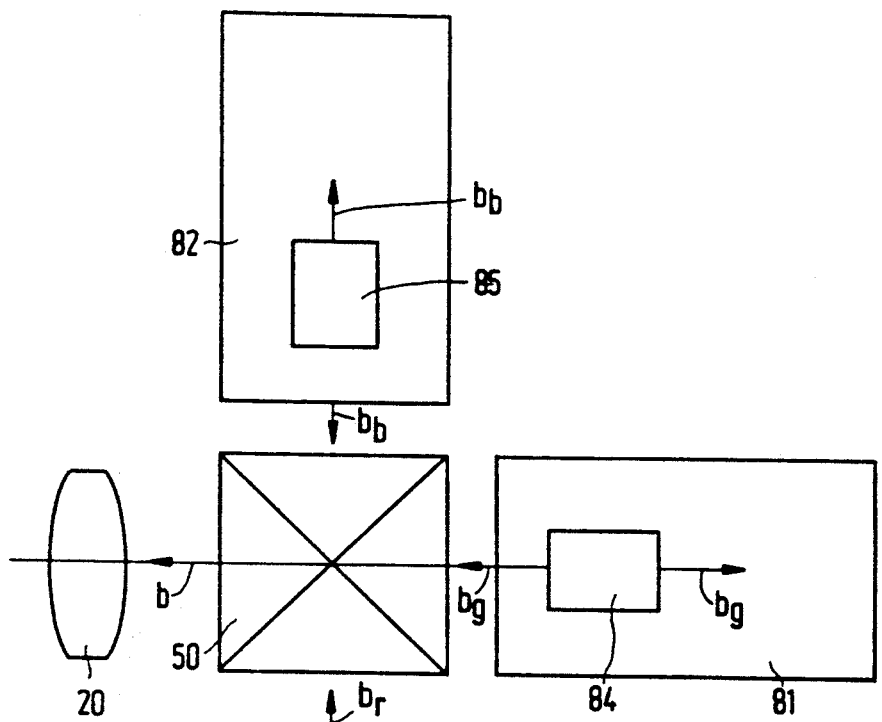
FIGS. 8a and 8b illustrate an embodiment of a colour image projection device having three light sources.

FIG. 8a shows schematically and in a plan view a colour projection arrangement having three colour channels 80, 81 and 82 for the primary colours red, green and blue, a separate radiation source 83, 84 and 85 and a separate polarisation-sensitive beam splitter being incorporated in each of the colour channels.

Figure 8B:
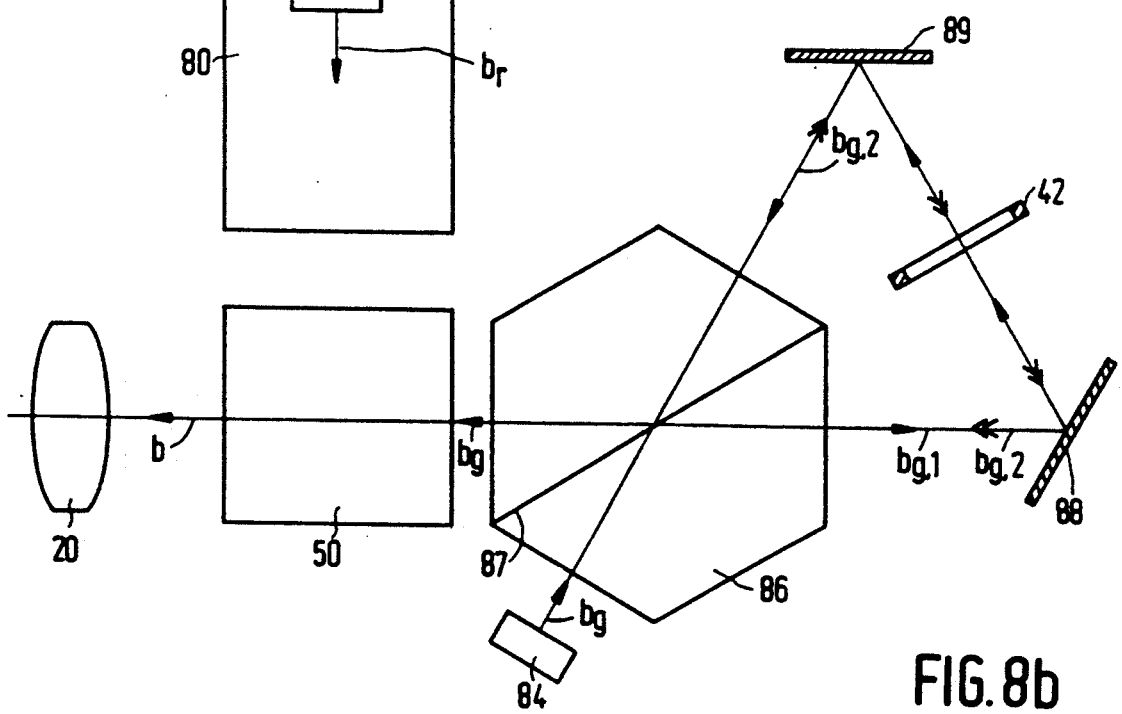

FIG. 8b shows the green colour channel in greater detail. This channel includes a source 84 for green light. The beam $b_g$ produced by this source is incident on a polarisation-sensitive beam splitting prism 86. At the separating layer 87, the p-polarised sub-beam $b_{g,1}$ is reflected to a first reflector 88, which directs the sub-beam $b_{g,1}$ to the image display panel for the green sub-image. After having passed through this panel, the sub-beam $b_{g,1}$ is incident on a second reflector 89 which reflects the sub-beam to the polarisation-sensitive beam splitter 86 where the polarisation modulation is converted into an intensity modulation.

The s-polarised sub-beam $b_{g,2}$ passes through the same path as the sub-beam $b_{g,1}$ in the opposite direction.

The colour channels 80 and 82 are of the same design as the colour channel 81. The monochrome beams $b_g$, $b_r$ and $b_b$ emanating from the colour channels are combined by, for example, a dichroic cross 50 into a coloured beam b which is projected by the projection lens system 20 onto a panel, not shown.

In the arrangement shown in the FIGS. 8a and 8b, the elements 86, 88 and 89 in the green colour channel 81 and the corresponding elements in the other colour channels 80 and 82 can be optimised for the relevant colour.

The arrangement shown in FIGS. 8a and 8b can again be of a compact design by the use of field lenses similar to the field lenses 26 and 27 in FIG. 4 or the use of intermediate lenses similar to the lenses 28 and 29 in FIG. 5b or a combination of these lenses.

Instead of transmission-display panels, the colour channels may alternatively include reflection panels. Then each colour channel may be, for example, of a design as shown in FIG. 3.

Figure 12:
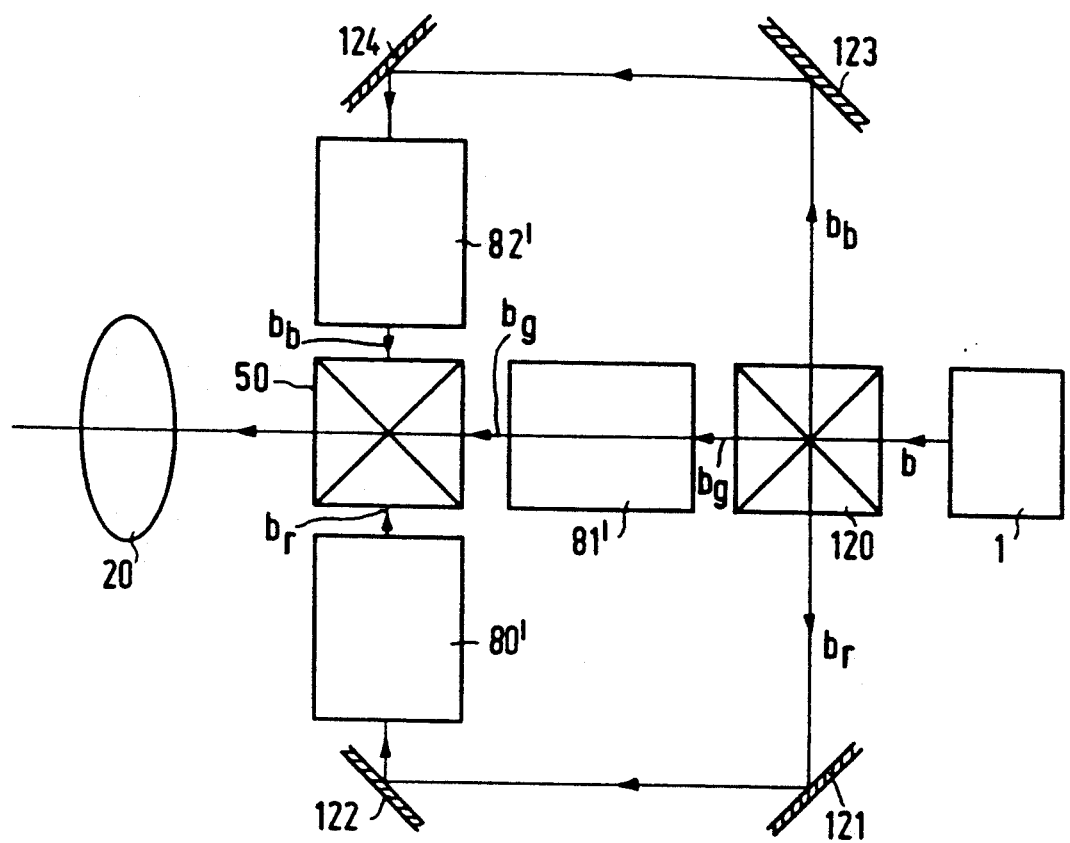
FIG. 12 illustrates an embodiment of a colour image projection device having one light source.

Instead of using a separate light source in each one of the colour channels, it is alternatively possible to use one common light source. The beam produced by this source is split by colour-selective means into three beams of the respective primary colours red, green and blue which are then conveyed to the red, green and blue colour channels. An embodiment of the arrangement in which this has been realized is schematically shown in FIG. 12. Said colour selective means may be constituted by a dichroic cross 120. Reference numerals 80', 81' and 82' denote the red, green and blue channel without radiation sources. One of the colour beams, for example $b_g$ is directly incident into the associated colour channel, whereas the other colour beams $b_r$ and $b_b$ are conveyed to the associated channels 80' and 82' via additional reflectors 121, 122 and 123, 124, respectively.

Figure 13:
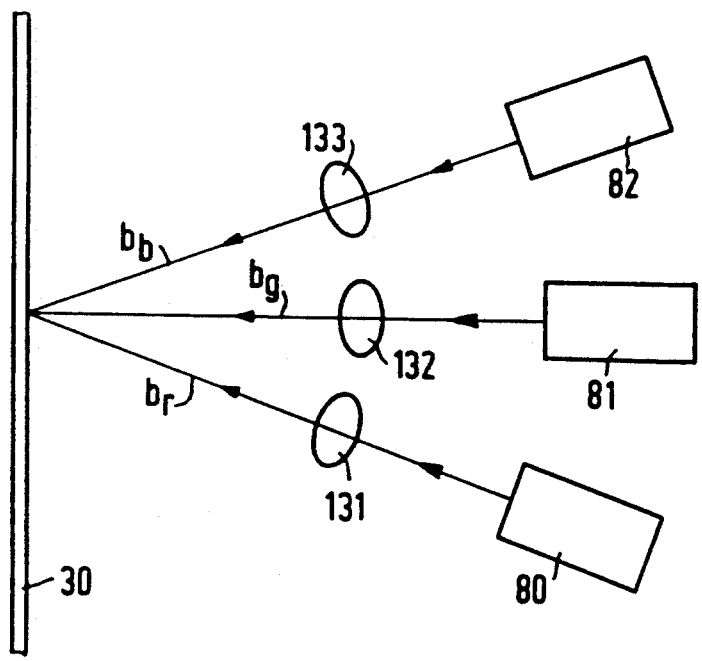
FIGS. 13 and 14 illustrate embodiments of a colour image projection device having three separate projection lenses.

FIG. 13 schematically illustrates an embodiment of the arrangement which is based on the same concept as the embodiment shown in FIG. 8, but in which the beams $b_r$, $b_g$ and $b_b$ are projected onto the screen 30 by separate projection lenses 131, 132 and 133, instead of being combined first and thereafter jointly projected by one projection lens. By tilting in the arrangement of FIG. 13 the picture display panels 41, 42, 43 or the colour channels 80, 81, 82 in their totality relative to each other, it can be ensured that the beams $b_r$, $b_g$ and $b_b$ accurately coincide on the projection screen.

The use of three projection lens systems has the advantage that each system can be optimized for the relatively narrow wavelengthband of the associated colour beam, so that the projection lens systems can be simpler and cheaper than a projection lens system for the projection of the three colour beams.

Figure 14:
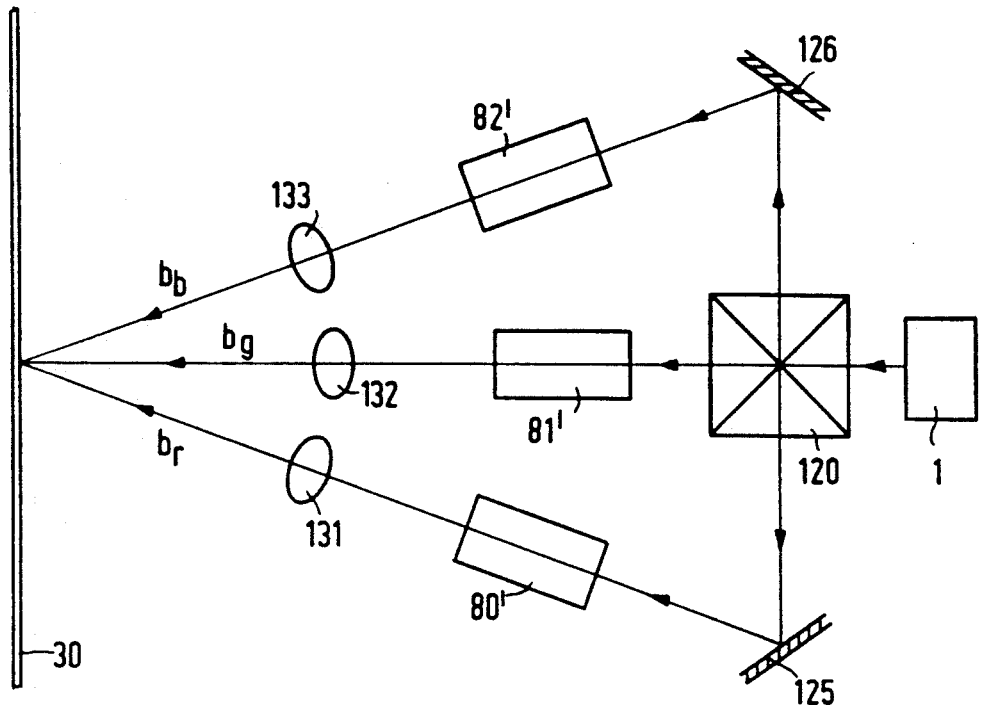

A projection device having three projection lenses may alternatively use one radiation source instead of three separate radiation sources, as is shown schematically in FIG. 14.

After the description of FIGS. 12 and 13, FIG. 14 does not require any further explanation.

The inventive idea is also suitable for use in a colour image projection device in which only one display panel is used. This arrangement may be of a structure as shown in FIGS. 3a and 3b, in which the monochrome panel 10 is replaced by a composite or colour panel. This colour panel then comprises a number of image elements which is, for example, three times as many as the number of image elements of a monochrome panel. The image elements of the colour panel are arranged in three groups, a red, green and blue sub-image beam being generated by these groups. As image element of each of the groups is always added to a image element on the projection panel. Each of the image elements is then, for example, preceded by an individual colour filter which only transmits the colour desired for the relevant image element.

Figure 9:
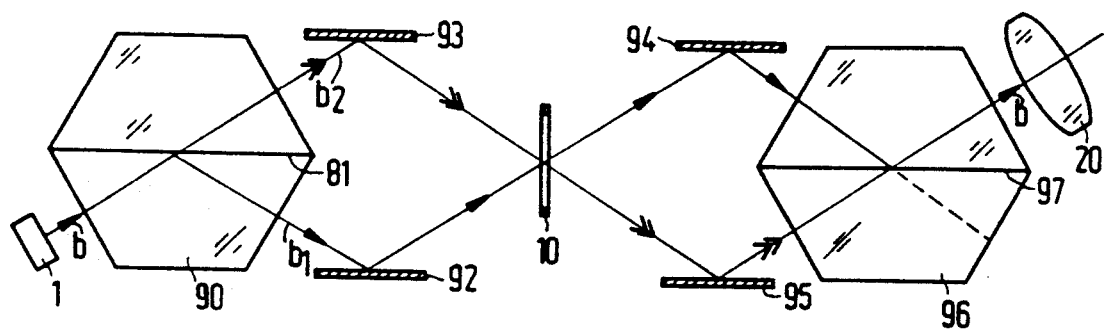
FIG. 9 illustrates an embodiment of the projection device in which two differently polarised beams are incident on the same side of a display panel.

FIG. 9 shows an embodiment of an image projection arrangement in which, similar to the arrangement shown in FIGS. 2a and 2b, separate polarisation-sensitive beam splitters 90 and 96 are used for splitting on the one hand (beam splitter 90) the beam b into two sub-beams $b_1$ and $b_2$ having mutually perpendicular polarisation directions and on the other hand for combining (beam splitter 96) these sub-beams after they have been modulated by the image display panel 10. The beam splitter 96 converts the polarisation modulation of the sub-beams $b_1$ and $b_2$ into an intensity modulation. The sub-beams $b_1$ and $b_2$ now pass through the image display panel in the same direction.

The p- and s-polarised sub-beams $b_1$ and $b_2$ emanating from the beam splitter 90 having polarisation separating plane 91 are reflected by their associated reflectors 92 and 93 to the same side of the image display panel 10. After having passed through this panel the sub-beams $b_1$ and $b_2$ are reflected by further reflectors 94 and 95 to the second beam splitter 96 having separating plane 97. The intensity-modulated beam b emanating from the beam splitter 96 is projected onto a panel, not shown, by the projection lens system 20.

The projection arrangement shown in FIG. 9 can be made suitable for colour image projection by providing at the position of the image display panel 10 a transmissive colour panel or a composite image display system having colour-splitting means and three monochrome panels, for example similar to FIGS. 6, 7a and 7b.

It should be noted that in the arrangement whose basic circuit diagram is shown in FIG. 9, an additional reflector will in practice be provided in the path of one of the beams $b_1$, $b_2$ to achieve that the images formed by these beams on the projection screen will have the same orientation, i.e. they are not mirror-inverted with respect to each other.

The arrangement shown in FIG. 9 again provides the possibility of arranging polarisation filters in positions in which the beams $b_1$ and $b_2$ are spatially separated to increase the degree of polarisation of those beams.

In the embodiments of the image projection device in which a polarisation-dependent beam splitter is only used to split the beam originating from the radiation source into two mutually perpendicular-polarised sub-beams, this beam splitter can be accomodated in one housing, together with the radiation source and any beam shaping optical means.

A polarisation-sensitive beam splitter in the image projection arrangement can be constituted in known manner by a Wollaston prism consisting of two cemented-together prisms of double-refractive material, the optical axes of the two prisms being perpendicular to each other. It is alternatively possible to utilise a what is commonly denoted a Glan-Thompson prism or a Glan-Taylor prism of double-refractive material, in which one beam component having one of the polarisation directions, p or s, is subject to total internal reflection at a prism face and the other component does not meet such an internal reflection. The two last-mentioned prisms as well as the Wollaston prism are expensive because of the double-refractive material to be used for them.

Figure 10:
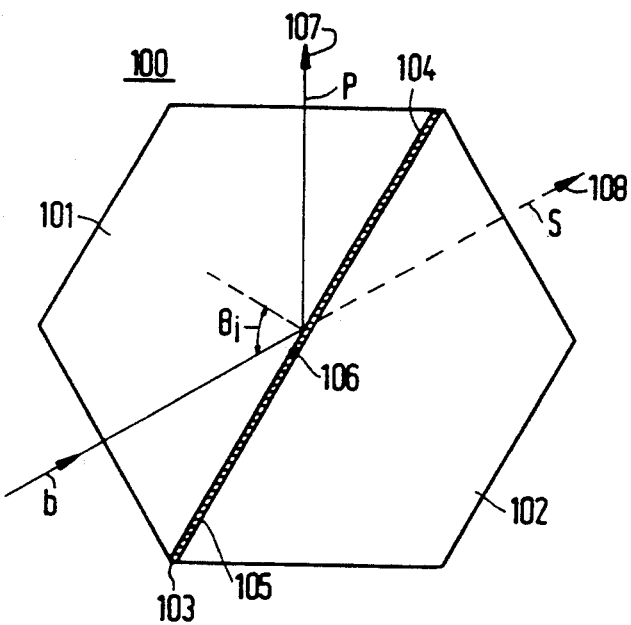
FIG. 10 illustrates a first embodiment of a polarisation-sensitive beam splitter which is preferably used in the projection device.

Therefore, preference should be given to use in image projection arrangements, more specifically those intended for consumer usages, the beam splitter shown in FIG. 10. This beam splitter 100 is formed by two transparent prisms 101 and 102 of, for example, glass, with an intermediate layer 103. This layer is formed by a liquid crystalline material, and consequently has double refraction. The ordinary index of refraction $n_o$ of the material is substantially always equal to approximately 1.5, while the extraordinary index of refraction $n_e$ can have a value between 1.6 and 1.8 depending on the composition of the layer 103. The prisms 101 and 102 are provided with what are commonly referred to as orientation layers 104 and 105 which ensure that the optical axis of the layer 103 is perpendicular to the plane of drawing. In FIG. 12 this axis is indicated by the circle 106.

The beam b incident on the beam splitter has two polarisation components, the p- and s-polarised components. Measures have been taken to ensure that the refractice index of the prism material is equal to $n_e$ of the layer 103, for example 1.8. If the beam b is incident on the layer 103 at an angle of incidence $\theta i$ which exceeds or is equal to the critical angle $\theta_g$ the p-polarised beam component is subjected to a total reflection in the direction of the arrow 107 as the ordinary refractice index applies to this component. For the s-polarised beam component, whose direction of polarisation extend transversely of the angle of incidence, the extraordinary refractive index of the liquid crystalline material applies, so that this component does not "see" any refractive index difference on passing through the beam splitter, and consequently passes through the layer 103 and the prism 102 in the original direction.

The refractive index difference $\Delta n = n_e - n_o$ of liquid crystalline material can be great, so that the beam splitter is suitable for a large range of angles of incidence. In addition it can be ensured, that the refractive index of the prism material and that of the layer 103 vary in the same way versus varying wavelength of the beam b, so that the beam splitter has a high polarisation efficiency for a large wavelength range. A very important advantage of the beam splitter of FIG. 10 is that it is cheap since no expensive double-refractive prism material need to be used and its production is relatively simple.

There is no need for the prisms 101 and 102 to be solid, it is alternatively possible for these prisms to consist of glass, or other transparent, walls in which a transparent liquid or synthetic material having a high refractive-index equal, to $n_e$ of the layer 103 is applied. These walls must have the same refractive index as the liquid or synthetic resin material which shall not show any depolarising effects.

Figure 11:
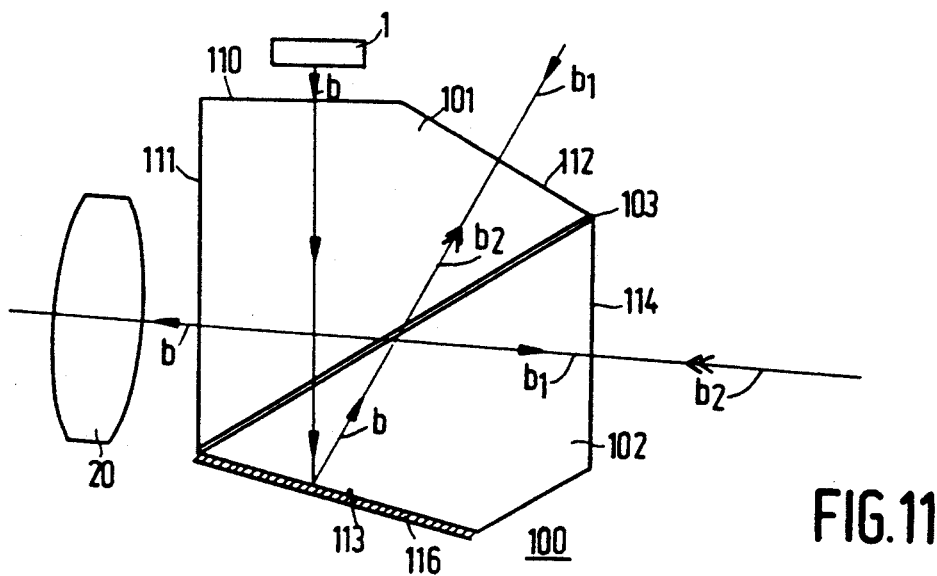
FIG. 11 illustrates a second embodiment of this beam splitter.

By a change in the construction of the beam splitter shown in FIG. 10, the image projection arrangement can be given a more compact construction, as is shown in FIG. 11. Measures have been taken to ensure that the plane 110 of prism 101 onto which the beam b originating from the source 1 is incident is perpendicular to this beam. In addition, the direction in which the beam is incident has been chosen such that at the position of the polarisation separating plane 103 the angle of incidence is less than the critical angle, so that the beam b is transmitted in its totality. The plane 113 of the prism 102 is coated with a reflecting layer 116 which reflects the beam b to the separating layer 103. At this second incidence on the layer 103 the angle of incidence exceeds the critical angle, as a result of which the desired separation according to polarisation direction occurs. The p-polarised beam $b_1$ leaves the prism 102 via the plane 114 and the s-polarised beam $b_2$ leaves the prism 101 via the plane 112.

The beam splitter 100 can also be used for combining the sub-beams $b_1$ and $b_2$ after they have been modulated with image information, for example in the case in which reflecting display panels are used. The modulated sub-beam $b_1$ coming from the right enters the prism 101 via the face 112 and is reflected or not reflected at the separating plane 103 to the projection lens 20, depending on whether its direction of polarisation has been rotated or not rotated. The modulated sub-beam $b_2$ coming from the right enters the prism 102 via the face 114 and is transmitted or not transmitted to the projection lens system 20 by the separating plane 103 depending on whether its direction of polarisation has been shifted or not. The polarisation-sensitive beam splitter again converts the polarisation modulation of the sub-beam into an intensity modulation.

Figure 15:
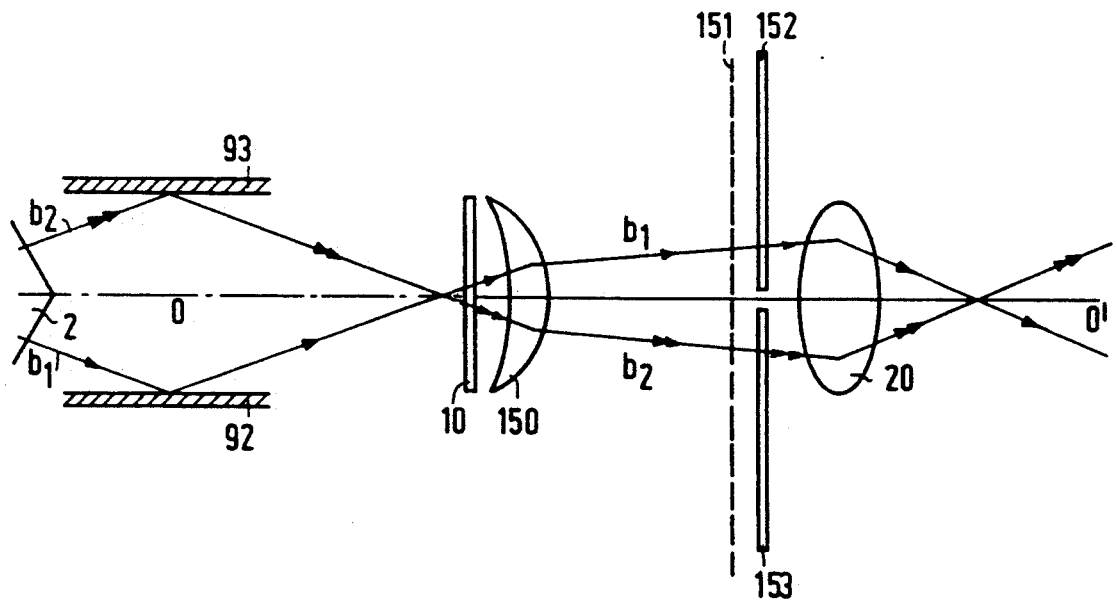
FIG. 15 illustrates a second embodiment of the projection device in which two differently polarised beams are incident on the same side of a display panel.

FIG. 15 is a partial view of an embodiment of the image projection device in which, as also in FIG. 9, an only partially shown polarisation-sensitive beam splitter is exclusively used for splitting a beam produced by a radiation source, into two sub-beams. These sub-beams $b_1$ and $b_2$ are reflected by their associated reflectors 92 and 93 to the same side of the image display panel 10, where they intersect. After passage through the panel 10, the beams $b_1$ and $b_2$ are deflected by a field lens 150 to the optical axis 00'. To approximately as far as the focal plane 151 the beams $b_1$ and $b_2$ partly coincide, thereafter they are fully separate. A first polarisation analyser 152 is disposed, behind the focal plane 151, in the path of only the beam $b_1$, a second polarisation analyser 153 is disposed in the path of only the beam $b_2$, which analysers convert the polarisation modulations of the beams $b_1$ and $b_2$ into intensity modulations. The intensity-modulated beams are projected onto the projection screen, not shown, by the projection lens system 20. The polarisation directions of the analysers 152 and 153 are perpendicular to each other so that the beams constituted by the beams $b_1$ and $b_2$ have the same polarity.

Although the present invention is in the first place intended for an image projection arrangement having directly driven image display panels it is not limited thereto. Also when used in an image projection arrangement having indirectly driven display panels, for example by means of cathode-ray tubes, the invention can increase the luminous flux.

I claim:

1. An image projection arrangement, comprising:
   (a) at least one radiation source for producing a beam along a radiation path;
   (b) at least one polarization-sensitive beam splitter arranged in the path of the beam for producing two mutually perpendicular-polarized sub-beams;
   (c) an image display system having at least one image display panel for generating at least one image to be displayed by modulating the direction of polarization of the beam in accordance with the image information; and
   (d) a projection lens system for projecting the image produced by the image display system onto a projection panel;

characterized in that the two sub-beams are both modulated by the same display panel.

2. An image projection arrangement as claimed in claim 1, characterized in that it comprises only one polarization-sensitive beam splitter for both producing the two sub-beams and recombining the two sub-beams after they have been modulated by the image display panel, and at least two reflectors, one in the radiation path of each of the two sub-beams, for re-directing the sub-beams emanating from the beam splitter back to the beam splitter via the image display panel.

3. An image projection arrangement as claimed in claim 2, characterized in that the image display panel is radiation-transmissive and that the sub-beams are incident on the panel substantially perpendicularly.

4. An image projection arrangement as claimed in claim 2, characterized in that the image display panel is reflective.

5. An image projection arrangement as claimed in claim 4, characterized in that the sub-beams are incident on the image display panel at an acute angle to the normal.

6. An image projection arrangement as claimed in claim 1, characterized in that:
   (a) the image display system is radiation-transmissive;
   (b) a first polarization-sensitive beam splitter is provided for splitting the beam from the radiation source into two mutually perpendicularly polarized sub-beams;
   (c) a first set of reflectors is provided for reflecting these sub-beams to the same side of the image display system;
   (d) a second polarization-sensitive beam splitter is provided for recombining the sub-beams transmitted by the display system; and
   (e) a second set of reflectors is provided for reflecting the transmitted sub-beams to the second polarization-sensitive beam splitter.

7. An image projection arrangement as claimed in claim 1, characterized in that:
   (a) the image display system is radiation-transmissive;
   (b) a first polarization-sensitive beam splitter is provided for splitting the beam from the radiation source into first and second mutually perpendicularly polarized sub-beams;
   (c) a second polarization-sensitive beam splitter is provided for reversing the direction of the first sub-beam;
   (d) a third polarization-sensitive beam splitter is provided for recombining the modulated sub-beams;
   (e) a first set of reflectors is provided for reflecting the first sub-beam from the first to the second beam splitter;
   (f) a reflector is provided for reflecting the first sub-beam from the first to the third beam splitter; and
   (g) a second set of reflectors is provided for reflecting the second sub-beam from the second beam splitter to the third beam splitter.

8. An image projection arrangement as claimed in claim 7, comprising a polarization-sensitive absorption filter arranged in the path of each sub-beam to block light having a direction of polarization different from that of the sub-beam.

9. An image projection arrangement as claimed in claim 1, characterized in that the at least one image display panel is a colour image display panel comprising colour-selective elements divided into groups, each group generating a sub-image of a predetermined colour.

10. An image projection arrangement as claimed in claim 1, characterized in that the image display system comprises a colour image display system having a plurality of image display panels and a plurality of colour-selective beam splitters for splitting each sub-beam into a plurality of monochrome sub-beams of different colours, and for recombining the image information-modulated monochrome sub-beams into a colour image information modulated sub-beam.

11. An image projection arrangement as claimed in claim 1, comprising a plurality of monochrome radiation sources for producing a corresponding number of monochrome beams along separate paths, the paths forming separate colour channels, and also comprising a monochrome image display panel in each path for producing a monochrome display image for that channel.

12. An image projection arrangement as claimed in claim 1, wherein the radiation source is polychromatic radiation source, and wherein at least one wavelength-selective beam splitter is employed for forming a plurality of separate monochromatic beams.

13. An image projection arrangement as claimed in claim 11 wherein the projection lens system comprises a plurality of separate projection lenses, each projecting one of the monochromatic images onto the projection panel.

14. An image projection arrangement as claimed in claim 1, wherein a polarization-rotating element for rotating the polarization direction through 90° is arranged in the radiation path.

15. An image projection arrangement as claimed in claim 14, characterized in that the polarization-rotating element is formed by a layer of nematic liquid crystalline material.

16. An image projection arrangement as claimed in claim 15, in which the image display panel comprises a layer of nematic liquid crystalline material having an orientation relative to the orientation of the polarization rotator such that in the non-energized state of the image display panel, a beam passing through the polarization-rotating element and the image display panel is not subjected to a polarization rotation.

17. An image projection arrangement as claimed in claim 1, in which the polarization-sensitive beam splitter comprises an assembly of two transparent elements having the same refractive index, and having facing inner surfaces, a layer of birefringent liquid crystalline material between the facing surfaces, and having one refractive index equal to that of the elements, and the other refractive index less than that of the elements.

18. An image projection arrangement as claimed in claim 17, characterized in that an outer surface of the beam splitter is internally reflective.

19. An image projection arrangement as claimed in claim 12 wherein the projection lens system comprises a plurality of separate projection lenses, each projecting one of the monochromatic images onto the projection panel.

* * * * *